(12) United States Patent
Czinger et al.

(10) Patent No.: US 12,325,138 B2
(45) Date of Patent: Jun. 10, 2025

(54) SYSTEMS AND METHODS FOR HIGH ACCURACY FIXTURELESS ASSEMBLY

(71) Applicant: DIVERGENT TECHNOLOGIES, INC., Los Angeles, CA (US)

(72) Inventors: Lukas Philip Czinger, Santa Monica, CA (US); Oussama Rawas, Allen, TX (US); Thomas Samuel Bowden, Jr., Los Angeles, CA (US); Roy Smith, Escondido, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 17/814,441

(22) Filed: Jul. 22, 2022

(65) Prior Publication Data

US 2023/0158675 A1 May 25, 2023

Related U.S. Application Data

(63) Continuation of application No. 16/222,926, filed on Dec. 17, 2018, now Pat. No. 11,449,021.

(51) Int. Cl.
*B25J 9/16* (2006.01)
*B22F 10/31* (2021.01)
(Continued)

(52) U.S. Cl.
CPC ............ *B25J 9/1682* (2013.01); *B22F 10/31* (2021.01); *B22F 12/90* (2021.01); *B25J 9/1628* (2013.01);
(Continued)

(58) Field of Classification Search
CPC ......... G05B 19/042; G05B 2219/31305; B25J 9/1628; B25J 9/1682
See application file for complete search history.

(56) References Cited

U.S. PATENT DOCUMENTS

| 5,148,591 A | 9/1992 | Pryor |
| 5,203,226 A | 4/1993 | Hongou et al. |

(Continued)

FOREIGN PATENT DOCUMENTS

| CA | 2936643 A1 | 5/2017 |
| CN | 107922016 A | 4/2018 |

(Continued)

OTHER PUBLICATIONS

US 9,202,136 B2, 12/2015, Schmidt et al. (withdrawn)

(Continued)

*Primary Examiner* — Mohammad Ali
*Assistant Examiner* — Vincent W Chang
(74) *Attorney, Agent, or Firm* — ArentFox Schiff LLP

(57) ABSTRACT

An approach to positioning one or more robotic arms in an assembly system may be described herein. For example, a system for robotic assembly may include a first robot, a second robot, and a control unit. The control unit may be configured to receive a first target location proximal to a second target location. The locations may indicate where the robots are to position the features. The control unit may be configured to calculate a first calculated location of the first feature of the first subcomponent, measure a first measured location of the first feature of the first subcomponent, determine a first transformation matrix between the first calculated location and the first measured location, reposition the first feature of the first subcomponent to the first target location using the first robot, the repositioning based on the first transformation matrix.

61 Claims, 11 Drawing Sheets

(51) Int. Cl.
  *B22F 12/90* (2021.01)
  *G05B 19/042* (2006.01)
  *B22F 10/25* (2021.01)
  *B22F 10/28* (2021.01)
(52) U.S. Cl.
  CPC ............ *G05B 19/042* (2013.01); *B22F 10/25* (2021.01); *B22F 10/28* (2021.01); *G05B 2219/31305* (2013.01)

(56) References Cited

U.S. PATENT DOCUMENTS

| | | | |
|---|---|---|---|
| 5,380,978 A | 1/1995 | Pryor | |
| 5,742,385 A | 4/1998 | Champa | |
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Gami et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaafhausen et al. | |
| 9,782,936 B2 | 10/2017 | Glunz et al. | |
| 9,783,324 B2 | 10/2017 | Embler et al. | |
| 9,783,977 B2 | 10/2017 | Alqasimi et al. | |
| 9,789,548 B2 | 10/2017 | Golshany et al. | |
| 9,789,922 B2 | 10/2017 | Dosenbach et al. | |
| 9,796,137 B2 | 10/2017 | Zhang et al. | |

(56) References Cited

U.S. PATENT DOCUMENTS

| | | |
|---|---|---|
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |

(56) References Cited

U.S. PATENT DOCUMENTS

| | | |
|---|---|---|
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2007/0017081 A1* | 1/2007 | Becker ............ B25J 9/1684 29/429 |
| 2010/0274390 A1 | 10/2010 | Walser et al. |
| 2014/0277669 A1 | 9/2014 | Nardi et al. |
| 2015/0336271 A1 | 11/2015 | Spicer et al. |
| 2017/0050277 A1 | 2/2017 | Shi et al. |
| 2017/0052534 A1* | 2/2017 | Ghanem ............ G05B 19/402 |
| 2017/0095930 A1 | 4/2017 | Warashina et al. |
| 2017/0113344 A1 | 4/2017 | Schönberg |
| 2017/0341309 A1 | 11/2017 | Piepenbrock et al. |
| 2018/0043540 A1 | 2/2018 | Satou |

FOREIGN PATENT DOCUMENTS

| | | |
|---|---|---|
| EP | 2965834 A2 | 1/2016 |
| JP | H11184526 A | 7/1999 |
| JP | 2011507714 A | 3/2011 |
| JP | 2017019053 A | 1/2017 |
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Office Action in CN201911304266.4, mailed on Dec. 27, 2022, 20 pages.
Extended European Search Report in EP19899588.8, mailed Nov. 17, 2022, 18 pages.
Bone, G.M. et al., "Vision-guided fixtureless assembly of automotive components", Department of Mechanical Engineering, McMaster Manufacturing Research Institute, McMaster University, Hamilton, Ont., Canada L8S 4L7b, Robotics and Computer Integrated Manufacturing, 19, pp. 79-87, 2003, Elsevier Science Ltd., [www.elsevier.com/locate/rcim].
Office Action in JP2021534991, mailed Dec. 5, 2023, 21 pages.

* cited by examiner

SYSTEMS AND METHODS FOR HIGH ACCURACY FIXTURELESS ASSEMBLY

CROSS-REFERENCE TO RELATED APPLICATIONS

This application is a continuation of U.S. application Ser. No. 16/222,926, filed Dec. 17, 2018 and entitled "SYSTEMS AND METHODS FOR HIGH ACCURACY FIXTURELESS ASSEMBLY", which application is incorporated by reference herein in its entirety.

BACKGROUND

Field

The present disclosure relates to transport structures such as automobiles, trucks, trains, boats, aircraft, motorcycles, metro systems, and the like, and more specifically to techniques for performing operations with robotic arms.

Background

A transport structure such as an automobile, truck or aircraft employs a large number of interior and exterior nodes. These nodes provide structure to the automobile, truck, and aircraft, and respond appropriately to the many different types of forces that are generated or that result from various actions like accelerating and braking. These nodes also provide support. Nodes of varying sizes and geometries may be integrated into a transport structure, for example, to provide an interface between panels, extrusions, and/or other structures. Thus, nodes are an integral part of transport structures.

Most nodes must be coupled to, or interface securely with, another part or structure in secure, well-designed ways. In order to securely connect a node with another part or structure, the node may need to undergo one or more processes in order to prepare the node to connect with the other part or structure. For example, the node may be machined at an interface in order to connect with various other parts or structures. Further examples of processes include surface preparation operations, heat treatment, electrocoating, electroplating, anodization, chemical etching, cleaning, support removal, powder removal, and so forth.

In order to produce a transport structure (e.g., a vehicle, an aircraft, a metro system, etc.), one or more assembly operations may be performed after a node is manufactured. For example, a node may be connected with a part, e.g., in order to form a portion of a transport structure (e.g., a vehicle chassis, etc.). Such assembly may involve a degree of accuracy that is within one or more tolerance thresholds of an assembly system, e.g., in order to ensure that the node is securely connected with the part and, therefore, the transport structure may be satisfactorily produced.

When robotic apparatuses (e.g., robotic end-of-arm tool center point) perform assembly operations, the robotic apparatuses are to be accurately positioned in order for the assembly operations to be accurately performed. For example, a robotic arm with which a node is engaged may be positioned so that the node is accurately connected with a part. Thus, a need exists for an approach to correctly positioning at least one robotic apparatus (e.g., a robotic end-of-arm tool center point) with a degree of precision that is within tolerance threshold(s) of an assembly system when performing various assembly operations.

SUMMARY

The present disclosure generally relates to assembly operations performed in association with the production of transport structures. Such assembly operations may include connection of nodes (e.g., additively manufactured nodes) with parts and/or other structures. Because transport structures are to be safe, reliable, and so forth, approaches to accurately performing various assembly operations associated with the production of transport structures may be beneficial. Such approaches to various assembly operations may be performed by at least one robotic arm that may be instructed via computer-generated instructions. Accordingly, a computer may implement various techniques to generate instructions for at least one robotic arm that causes the at least one robotic arm to be correctly positioned when performing various assembly operations.

In the present disclosure, systems and methods for positioning a robotic arm may be described. In one aspect, a method of robotic assembly includes receiving a first target location indicating where a first robot is to position a first feature of a first subcomponent. The first target location may be proximal to a second target location indicating where a second robot is to position a second feature of a second subcomponent such that the first subcomponent and the second subcomponent form a component when coupled together with the first feature of the first subcomponent in the first location and the second feature of the second subcomponent in the second location. The method of robotic assembly also includes calculating a first calculated location of the first feature of the first subcomponent and measuring a first measured location of the first feature of the first subcomponent. Additionally, the method of robotic assembly includes determining a first transformation matrix between the first calculated location and the first measured location and repositioning the first feature of the first subcomponent to the first target location using the first robot. The repositioning may be based on the first transformation matrix.

In one aspect, a system for robotic assembly includes a first robot, a second robot, and a control unit. The control unit may be configured to receive a first target location indicating where the first robot is to position a first feature of a first subcomponent. The first target location may be proximal to a second target location indicating where the second robot is to position a second feature of a second subcomponent such that the first subcomponent and the second subcomponent form a component when coupled together with the first feature of the first subcomponent in the first location and the second feature of the second subcomponent in the second location. The control unit may also be configured to calculate a first calculated location of the first feature of the first subcomponent and measure a first measured location of the first feature of the first subcomponent. Additionally, the control unit may be configured to determine a first transformation matrix between the first calculated location and the first measured location and reposition the first feature of the first subcomponent to the first target location using the first robot. The repositioning may be based on the first transformation matrix.

In one aspect, a robotic assembly control unit includes at least one processor and a memory coupled to the at least one processor. The memory includes instructions configuring the control unit to receive a first target location indicating where a first robot is to position a first feature of a first subcomponent. The first target location is proximal to a second target location indicating where a second robot is to position a second feature of a second subcomponent such that the first subcomponent and the second subcomponent form a component when coupled together with the first feature of the first subcomponent in the first location and the second feature of the second subcomponent in the second location. The memory also includes instructions configuring the control unit to calculate a first calculated location of the first feature of the first subcomponent and measure a first measured location of the first feature of the first subcomponent. Additionally, the memory includes instructions configuring the control unit to determine a first transformation matrix between the first calculated location and the first measured location and reposition the first feature of the first subcomponent to the first target location using the first robot. The repositioning is based on the first transformation matrix.

In one aspect, a computer-readable medium stores computer executable code for robotic assembly. In an aspect, the computer-readable medium may be cloud-based computer-readable mediums, such as a hard drive on a server attached to the Internet. The code, when executed by a processor, causes the processor to receive a first target location indicating where a first robot is to position a first feature of a first subcomponent. The first target location may be proximal to a second target location indicating where a second robot is to position a second feature of a second subcomponent such that the first subcomponent and the second subcomponent form a component when coupled together with the first feature of the first subcomponent in the first location and the second feature of the second subcomponent in the second location. The code, when executed by a processor, causes the processor to calculate a first calculated location of the first feature of the first subcomponent and measure a first measured location of the first feature of the first subcomponent. The code, when executed by a processor, causes the processor to determine a first transformation matrix between the first calculated location and the first measured location and reposition the first feature of the first subcomponent to the first target location using the first robot. The repositioning is based on the first transformation matrix.

It will be understood that other aspects of mechanisms for realizing high accuracy fixtureless assembly with additively manufactured components and the manufacture thereof will become readily apparent to those skilled in the art from the following detailed description, wherein it is shown and described only several embodiments by way of illustration. As will be realized by those skilled in the art, the disclosed subject matter is capable of other and different embodiments, and its several details are capable of modification in various other respects, all without departing from the invention. Accordingly, the drawings and detailed description are to be regarded as illustrative in nature and not as restrictive.

DETAILED DESCRIPTION

The detailed description set forth below in connection with the appended drawings is intended to provide a description of various exemplary embodiments and is not intended to represent the only embodiments in which the invention may be practiced. The terms "exemplary," "illustrative," and the like used throughout the present disclosure mean "serving as an example, instance, or illustration," and should not necessarily be construed as preferred or advantageous over other embodiments presented in the present disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout the present disclosure. In addition, the figures may not be drawn to scale and instead may be drawn in a way that attempts to most effectively highlight various features relevant to the subject matter described.

Additive Manufacturing (3-D Printing). Additive manufacturing (AM) is advantageously a non-design specific manufacturing technique. AM provides the ability to create complex structures within a part. For example, nodes can be produced using AM. A node is a structural member that may include one or more interfaces used to connect to other spanning components such as tubes, extrusions, panels, other nodes, and the like. Using AM, a node may be constructed to include additional features and functions, depending on the objectives. For example, a node may be printed with one or more ports that enable the node to secure two parts by injecting an adhesive rather than welding multiple parts together, as is traditionally done in manufacturing complex products. Alternatively, some components may be connected using a brazing slurry, a thermoplastic, a thermoset, or another connection feature, any of which can be used interchangeably in place of an adhesive. Thus, while welding techniques may be suitable with respect to certain embodiments, additive manufacturing provides significant flexibility in enabling the use of alternative or additional connection techniques.

Figure 1:
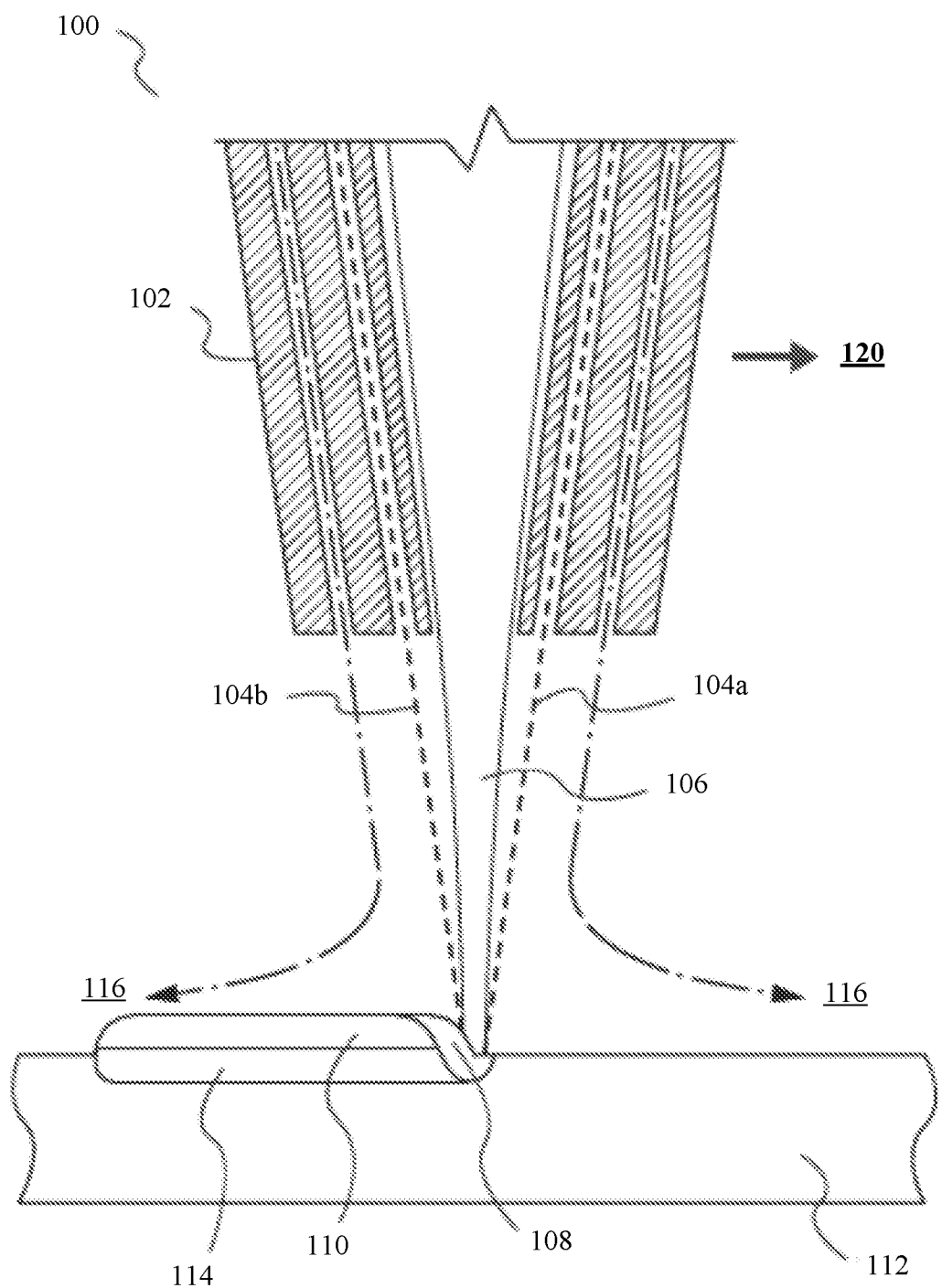
FIG. 1 is a diagram illustrating an exemplary embodiment of certain aspects of a Direct Metal Deposition (DMD) 3-D printer.

A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with apparently no wasted motion. As another illustration, electron beam additive manufacturing processes use an electron beam to deposit metal via wire feedstock or sintering on a powder bed in a vacuum chamber. Single Pass Jetting is another exemplary technology claimed by its developers to be much quicker than conventional laser-based systems. Atomic Diffusion Additive Manufacturing (ADAM) is still another recently developed technology in which components are printed, layer-by-layer, using a metal powder in a plastic binder. After printing, plastic binders are removed, and the entire part is sintered at once into a desired metal. One of several such AM techniques, as noted, is DMD. FIG. 1 illustrates an exemplary embodiment of certain aspects of a DMD 3-D printer 100. DMD printer 100 uses feed nozzle 102 moving in a predefined direction 120 to propel powder streams 104a and 104b into a laser beam 106, which is directed toward a workpiece 112 that may be supported by a substrate. Feed nozzle may also include mechanisms for streaming a shield gas 116 to protect the welded area from oxygen, water vapor, or other components.

The powdered metal is then fused by the laser 106 in a melt pool region 108, which may then bond to the workpiece 112 as a region of deposited material 110. The dilution area 114 may include a region of the workpiece where the deposited powder is integrated with the local material of the workpiece. The feed nozzle 102 may be supported by a computer numerical controlled (CNC) robot or a gantry, or another computer-controlled mechanism. The feed nozzle 102 may be moved under computer control multiple times along a predetermined direction of the substrate until an initial layer of the deposited material 110 is formed over a desired area of the workpiece 112. The feed nozzle 102 can then scan the region immediately above the prior layer to deposit successive layers until the desired structure is formed. In general, the feed nozzle 102 may be configured to move with respect to all three axes, and in some instances to rotate on its own axis by a predetermined amount.

Figure 2:
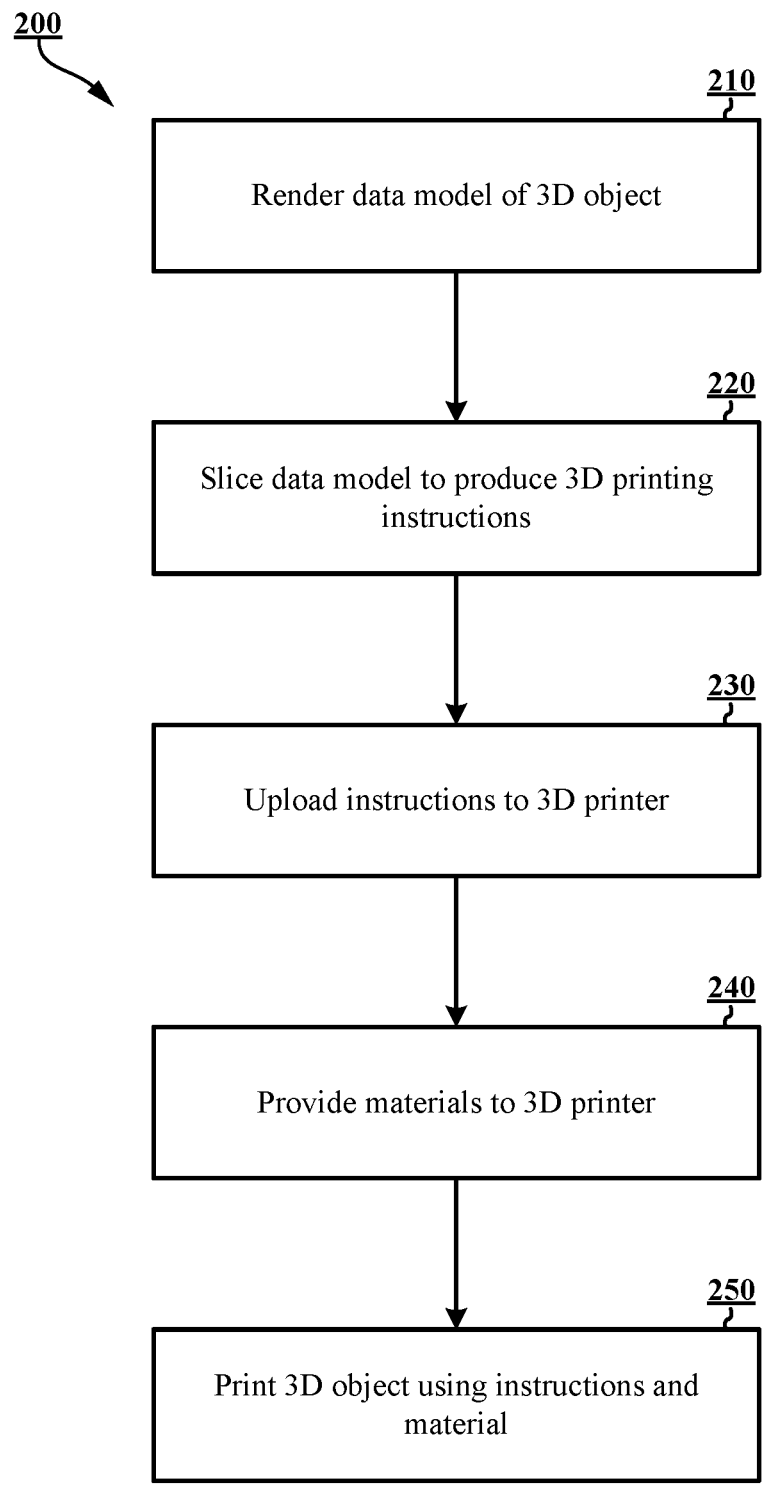
FIG. 2 is a conceptual flow diagram of a 3-D printing process using a 3-D printer.

FIG. 2 is a flow diagram 200 illustrating an exemplary process of 3-D printing. A data model of the desired 3-D object to be printed is rendered (operation 210). A data model is a virtual design of the 3-D object. Thus, the data model may reflect the geometrical and structural features of the 3-D object, as well as its material composition. The data model may be created using a variety of methods, including CAE-based optimization, 3D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL is one example of a file format associated with commercially available stereolithography-based CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (operation 220). Numerous slicer programs are commercially available. Generally, the slicer program converts the data model into a series of individual layers representing thin slices (e.g., 100 microns thick) of the object being printed, along with a file containing the printer-specific instructions for 3-D printing these successive individual layers to produce an actual 3-D printed representation of the data model.

The layers associated with 3-D printers and related print instructions need not be planar or identical in thickness. For example, in some embodiments depending on factors like the technical sophistication of the 3-D printing equipment and the specific manufacturing objectives, etc., the layers in a 3-D printed structure may be non-planar and/or may vary in one or more instances with respect to their individual thicknesses.

A common type of file used for slicing data models into layers is a G-code file, which is a numerical control programming language that includes instructions for 3-D printing the object. The G-code file, or other file constituting the instructions, is uploaded to the 3-D printer (operation 230). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (operation 240). In DMD techniques, for example, one or more metal powders may be selected for layering structures with such metals or metal alloys. In selective laser melting (SLM), selective laser sintering (SLS), and other PBF-based AM methods (see below), the materials may be loaded as powders into chambers that feed the powders to a build platform. Depending on the 3-D printer, other techniques for loading printing materials may be used.

The respective data slices of the 3-D object are then printed based on the provided instructions using the material (s) (operation 250). In 3-D printers that use laser sintering, a laser scans a powder bed and melts the powder together where the structure is desired and avoids scanning areas where the sliced data indicates that nothing is to be printed. This process may be repeated thousands of times until the desired structure is formed, after which the printed part is removed from a fabricator. In fused deposition modeling, as described above, parts are printed by applying successive layers of model and support materials to a substrate. In general, any suitable 3-D printing technology may be employed for purposes of the present disclosure.

Another AM technique includes powder-bed fusion ("PBF"). Like DMD, PBF creates 'build pieces' layer-by-layer. Each layer or 'slice' is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 3A-D illustrate respective side views of an exemplary PBF system 300 during different stages of operation. As noted above, the particular embodiment illustrated in FIGS. 3A-D is one of many suitable examples of a PBF system employing principles of the present disclosure. It should also be noted that elements of FIGS. 3A-D and the other figures in the present disclosure are not necessarily drawn to scale but may be drawn larger or smaller for the purpose of better illustration of concepts described herein.

PBF system 300 can include a depositor 301 that can deposit each layer of metal powder, an energy beam source 303 that can generate an energy beam, a deflector 305 that can apply the energy beam to fuse the powder, and a build plate 307 that can support one or more build pieces, such as a build piece 309. PBF system 300 can also include a build floor 311 positioned within a powder bed receptacle. The walls of the powder bed receptacle 312 generally define the boundaries of the powder bed receptacle, which is sandwiched between the walls 312 from the side and abuts a portion of the build floor 311 below. Build floor 311 can progressively lower build plate 307 so that depositor 301 can deposit a next layer. The entire mechanism may reside in a chamber 313 that can enclose the other components, thereby protecting the equipment, enabling atmospheric and temperature regulation and mitigating contamination risks. Depositor 301 can include a hopper 315 that contains a powder 317, such as a metal powder, and a leveler 319 that can level the top of each layer of deposited powder.

Figure 3A:
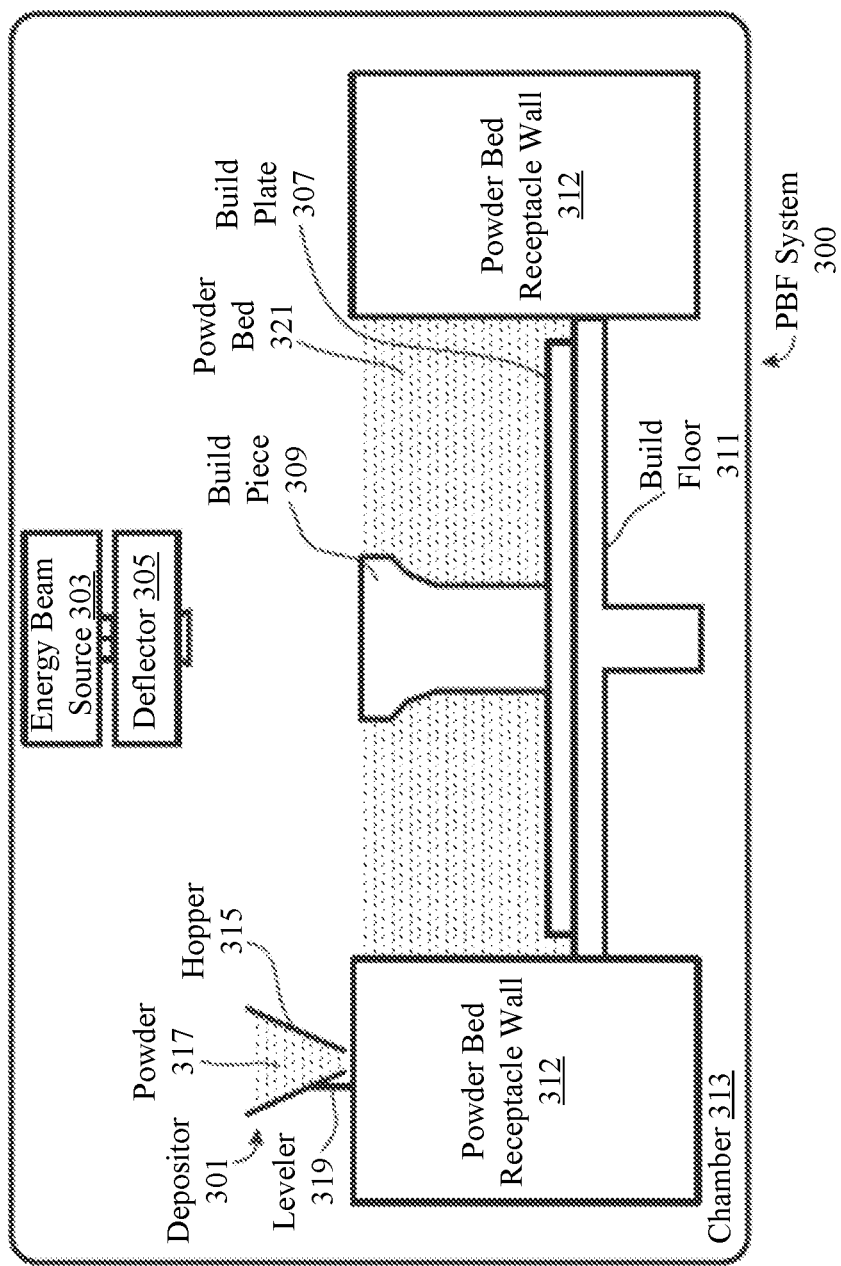
FIGS. 3A-D is a diagram illustrating exemplary powder bed fusion (PBF) systems during different stages of operation.

Referring specifically to FIG. 3A, this figure shows PBF system 300 after a slice of build piece 309 has been fused, but before the next layer of powder has been deposited. In fact, FIG. 3A illustrates a time at which PBF system 300 has already deposited and fused slices in multiple layers, e.g., 150 layers, to form the current state of build piece 309, e.g., formed of 150 slices. The multiple layers already deposited have created a powder bed 321, which includes powder that was deposited but not fused.

Figure 3B:
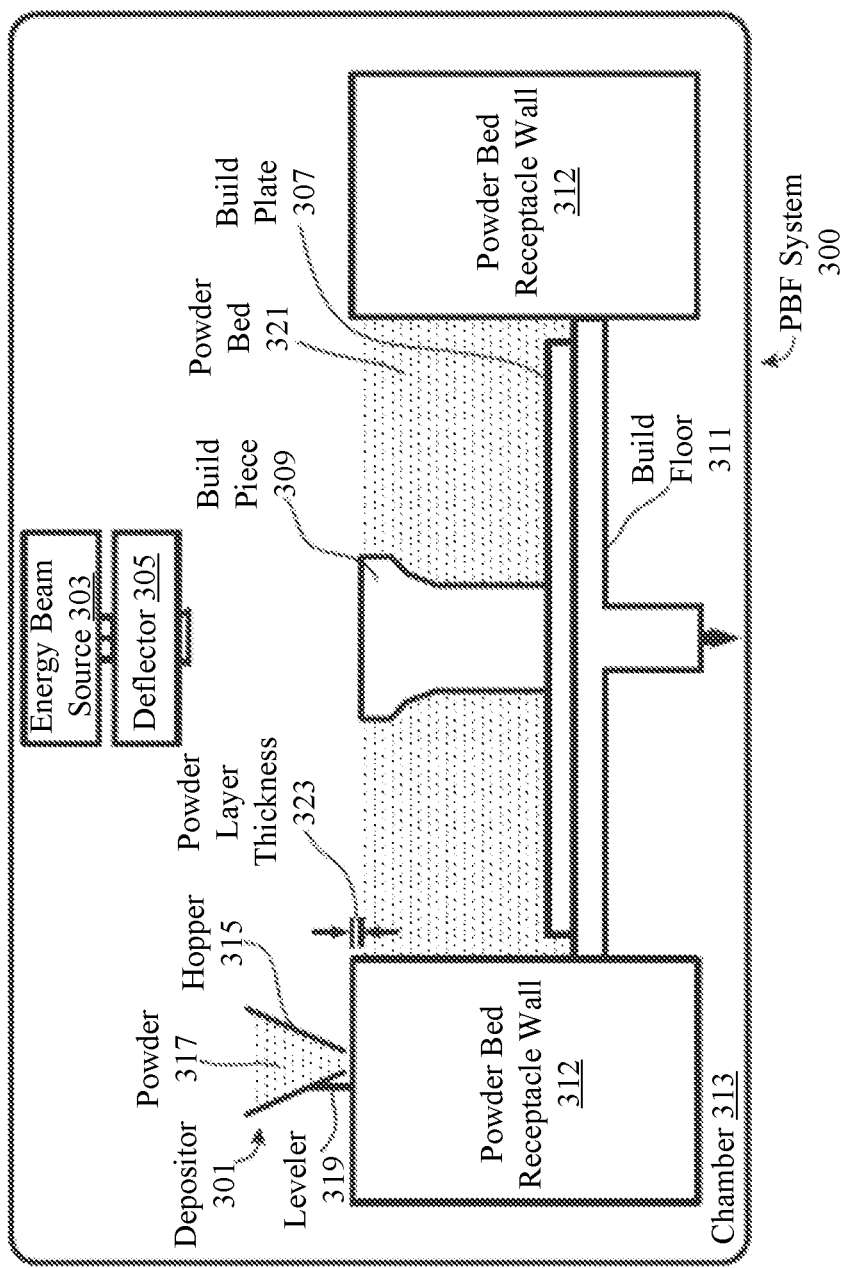

FIG. 3B shows PBF system 300 at a stage in which build floor 311 can lower by a powder layer thickness 323. The lowering of build floor 311 causes build piece 309 and powder bed 321 to drop by powder layer thickness 323, so that the top of the build piece and powder bed are lower than the top of powder bed receptacle wall 312 by an amount equal to the powder layer thickness. In this way, for example, a space with a consistent thickness equal to powder layer thickness 323 can be created over the tops of build piece 309 and powder bed 321.

Figure 3C:
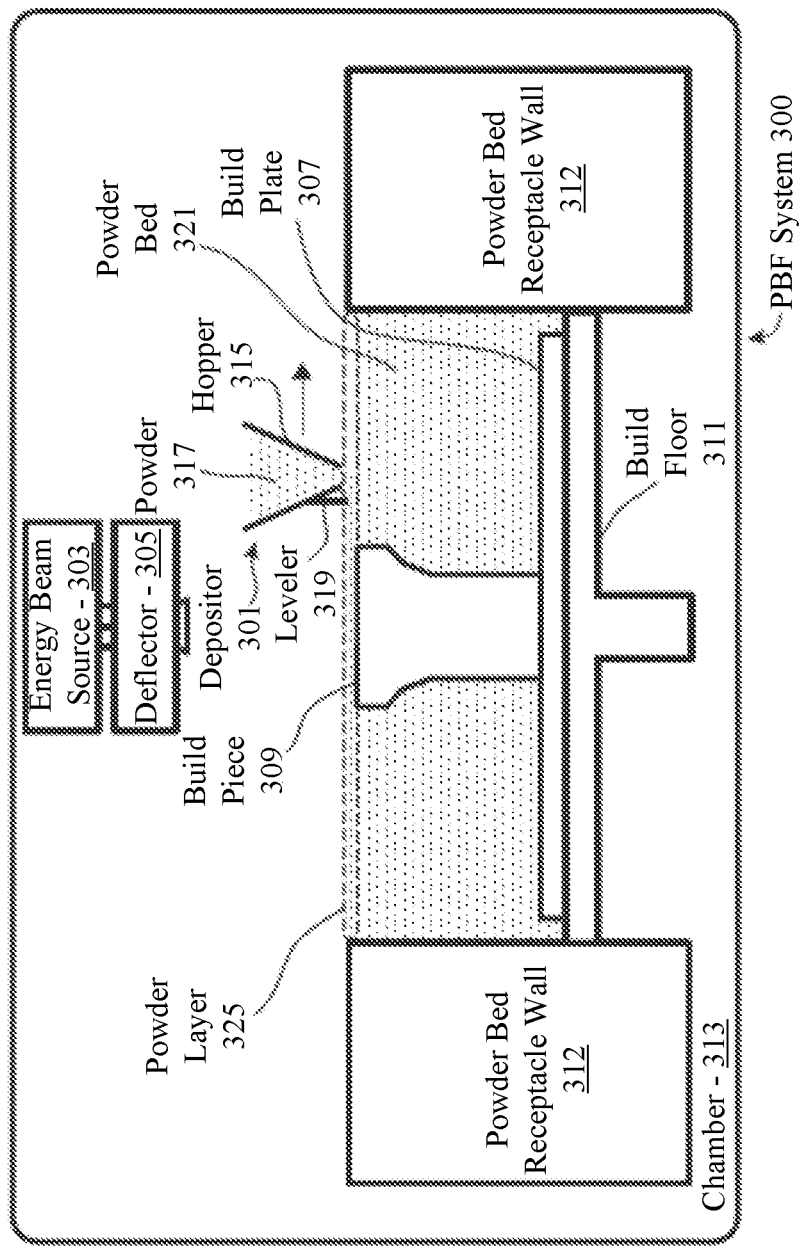

FIG. 3C shows PBF system 300 at a stage in which depositor 301 is positioned to deposit powder 317 in a space created over the top surfaces of build piece 309 and powder bed 321 and bounded by powder bed receptacle walls 312. In this example, depositor 301 progressively moves over the defined space while releasing powder 317 from hopper 315. Leveler 319 can level the released powder to form a powder layer 325 that has a thickness substantially equal to the powder layer thickness 323 (see FIG. 3B). Thus, the powder in a PBF system can be supported by a powder support structure, which can include, for example, a build plate 307, a build floor 311, a build piece 309, walls 312, and the like. It should be noted that the illustrated thickness of powder layer 325 (i.e., powder layer thickness 323 (FIG. 3B)) is greater than an actual thickness used for the example involving 350 previously-deposited layers discussed above with reference to FIG. 3A.

Figure 3D:
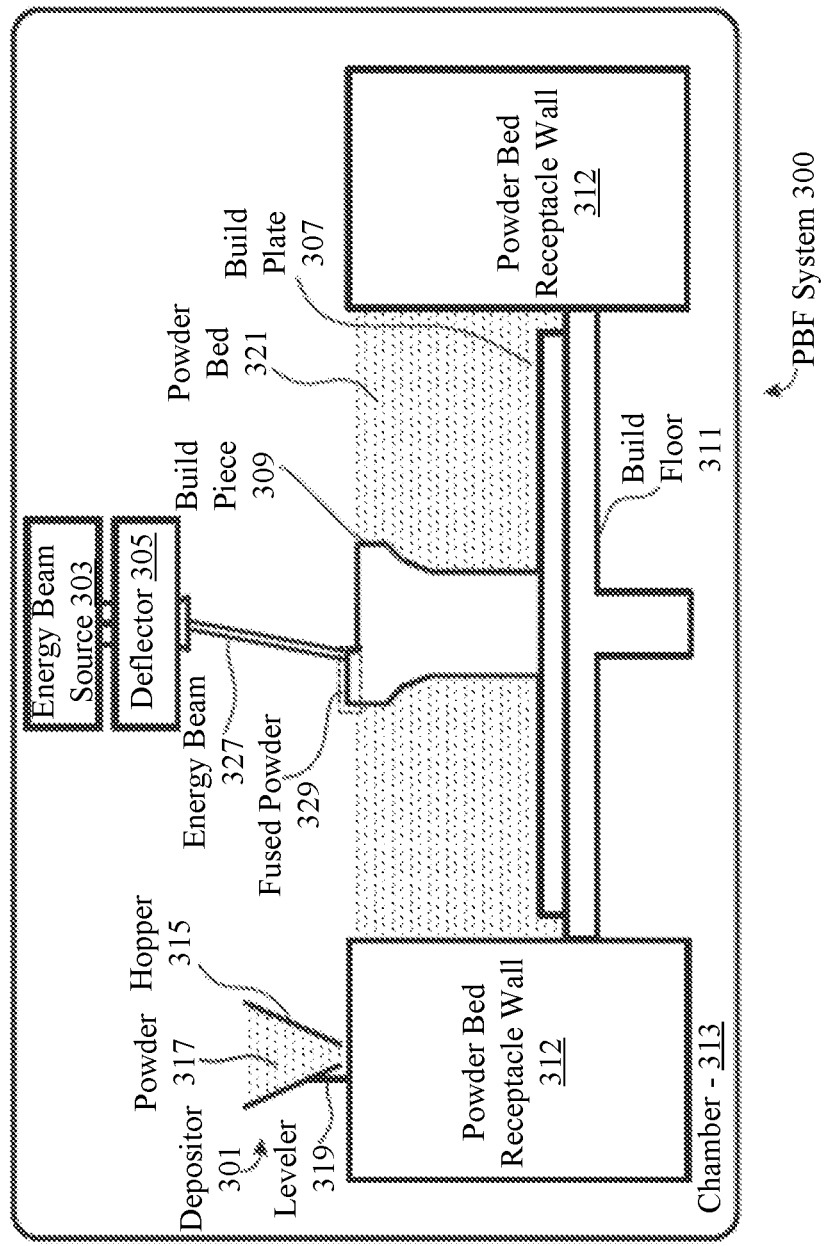

FIG. 3D shows PBF system 300 at a stage in which, following the deposition of powder layer 325 (FIG. 3C), energy beam source 303 generates an energy beam 327 and deflector 305 applies the energy beam to fuse the next slice in build piece 309. In various exemplary embodiments, energy beam source 303 can be an electron beam source, in which case energy beam 327 constitutes an electron beam. Deflector 305 can include deflection plates that can generate an electric field or a magnetic field that selectively deflects the electron beam to cause the electron beam to scan across areas designated to be fused. In various embodiments, energy beam source 303 can be a laser, in which case energy beam 327 is a laser beam. Deflector 305 can include an optical system that uses reflection and/or refraction to manipulate the laser beam to scan selected areas to be fused.

In various embodiments, the deflector 305 can include one or more gimbals and actuators that can rotate and/or translate the energy beam source to position the energy beam. In various embodiments, energy beam source 303 and/or deflector 305 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

The present disclosure presents various approaches to positioning at least one robotic arm in an assembly system. For example, an assembly system may include two robots, each of which may include a respective robotic arm. A first robotic arm may be configured to engage with a node during various operations performed with the node. For example, the first robotic arm may engage with a node that is to be connected with a part, and the part may be engaged by a second robotic arm. Various operations performed with the node (e.g., connecting the node with a part) may be performed with a relatively high degree of precision. Accordingly, at least one of the robotic arms may be positioned (e.g., repositioned) during an operation with the node in order to function in accordance with the precision commensurate with the operation.

In some aspects, the first robotic arm may engage with the node and the second robotic arm may engage with a part. An operation with the node may include connecting the node with the part. Thus, the first robotic arm may be positioned relative to the second robotic arm and/or the second robotic arm may be positioned relative to the first robotic arm. When the first and/or second robotic arms are configured to move, the first and/or second robotic arms may be positioned (e.g., repositioned) relative to the other one of the first and/or second robotic arms. Such positioning may correct the position(s) of the first and/or second robotic arms, e.g., to maintain the precision necessary for operations with a node, including connecting a node with a part by the first and second robotic arms.

The present disclosure provides various different embodiments of positioning one or more robotic arms of an assembly system for assembly processes and/or post-processing operations. It will be appreciated that various embodiments described herein may be practiced together. For example, an embodiment described with respect to one illustration of the present disclosure may be implemented in another embodiment described with respect to another illustration of the present disclosure.

Figure 4:
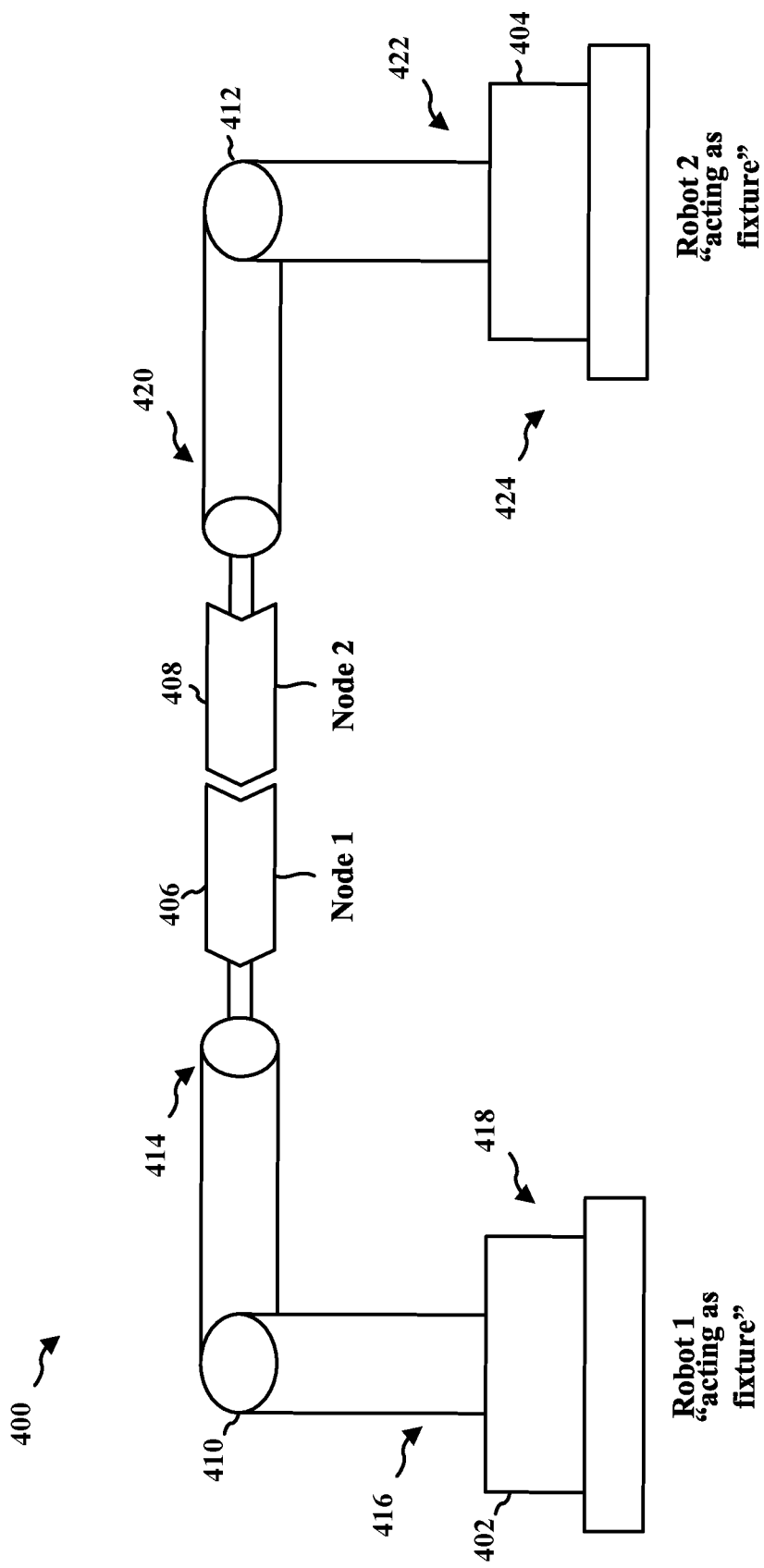
FIG. 4 is a diagram illustrating a perspective of a first assembly system including a plurality of robots acting as fixtures.

FIG. 4 is a diagram illustrating a perspective of a first assembly system 400 including a plurality of robots 402, 404 acting as fixtures for two nodes 406, 408. The assembly system 400 may be employed in various operations associated with the assembly of a node-based transport structure. In one embodiment, the assembly system 400 may perform at least a portion of the assembly of the node-based transport structure without any fixtures. For example, the assembly system 400 may be implemented for connecting a first node 406 (node 1) with a second node 408 (node 2) (although other implementations are possible without departing from the scope of the present disclosure). In an aspect, at least one of the first node 406 (e.g., first subcomponent) or the second node 408 (e.g., second subcomponent) may include a complex structure such as a chassis for a transport structure.

The assembly system 400 may include a first robotic arm 410 on the first robot 402 (robot 1). The first robotic arm 410 may have a distal end 414 and a proximal end 416. The distal end 414 may be configured for movement, e.g., for operations associated with a node and/or part, e.g., the first node 406. The proximal end 416 may secure the first robotic arm 410, e.g., to a base 418.

The distal end 414 of the first robotic arm 410 may be connected with a tool flange. The tool flange may be configured to connect with one or more components (e.g., tools) so that the first robotic arm 410 may connect with the one or more components and position the one or more components as the first robotic arm 410 moves.

In the illustrated embodiment, the distal end 414 of the first robotic arm 410 may be connected with an end effector, e.g., by means of the tool flange. That is, the end effector may be connected with the tool flange, and the tool flange may be connected with the distal end 414 of the first robotic arm 410. The end effector may be a component configured to interface with various parts, nodes, and/or other structures. Illustratively, the end effector may be configured to engage with a node 406 (however, the end effector may be configured to engage with a part or other structure). Examples of an end effector may include jaws, grippers, pins, or other similar components capable of engaging a node, part, or other structure.

As illustrated, the assembly system 400 may further include a second robotic arm 412 on the second robot 404. The second robotic arm 412 may have a distal end 420 and a proximal end 422. The proximal end 422 of the second robotic arm 412 may be connected with a base 424, e.g., in order to secure the second robotic arm 412. Illustratively, the first robotic arm 410 and the second robotic arm 412 may be located in the assembly system 400 to be approximately facing one another, e.g., so that the distal end 414 of the first robotic arm 410 extends towards the distal end 420 of the second robotic arm 412 and, correspondingly, the distal end 420 of the second robotic arm 412 extends towards the distal end 414 of the first robotic arm 410. However, the first and second robotic arms 410, 412 may be differently located in the assembly system 400 in other embodiments, e.g., according to an assembly operation that is to be performed.

Similar to the first robotic arm 410, the distal end 420 of the second robotic arm 412 may be connected with a tool flange, and the tool flange may be connected with an end effector. The end effector may be configured to engage with a node, part, or other structure, such as the node 408 (node 2) that is to be connected with the node 406.

Industrial robots may produce highly repeatable movements. For example, the robots 402, 404 may be able to position each of the respective robot arms 410, 412 repeatedly. The repeatability of the positioning may be accurate to about 60 microns when compared to another positioning, in an example. However, the placement relative to a specific positioning or absolute positioning may suffer from lower accuracy, e.g., approximately 400 microns.

Accordingly, because positioning of a robot arm 410, 412 may be accurate relative to a previous positioning, but not as accurate relative to an absolute position, e.g., a specific x, y, z location where the robot may be directed by a control unit, robots 402, 404 may generally not be suitable for use as high accuracy fixtures. The absolute positioning accuracy issue may be amplified when assembly hard points are driven by nominal location data. For example, parts tolerances may add in ways that negatively impact the tolerances of the assembled part when robotic positioning is used.

Metrology is the science of measurement. Using measurements to guide the robot, metrology guidance may be used to guide the robots 402, 404 as assembly fixtures, as is discussed in greater detail with respect to FIG. 5. For example, metrology systems may offer accuracy in the range of approximately 30 microns. Using the guidance of a metrology system industrial robots can realize greatly improved accuracy (in the micron scale). With this improvement in accuracy, the tool center point (TCP) of industrial robots can be used as a high accuracy flexible fixture.

Figure 5:
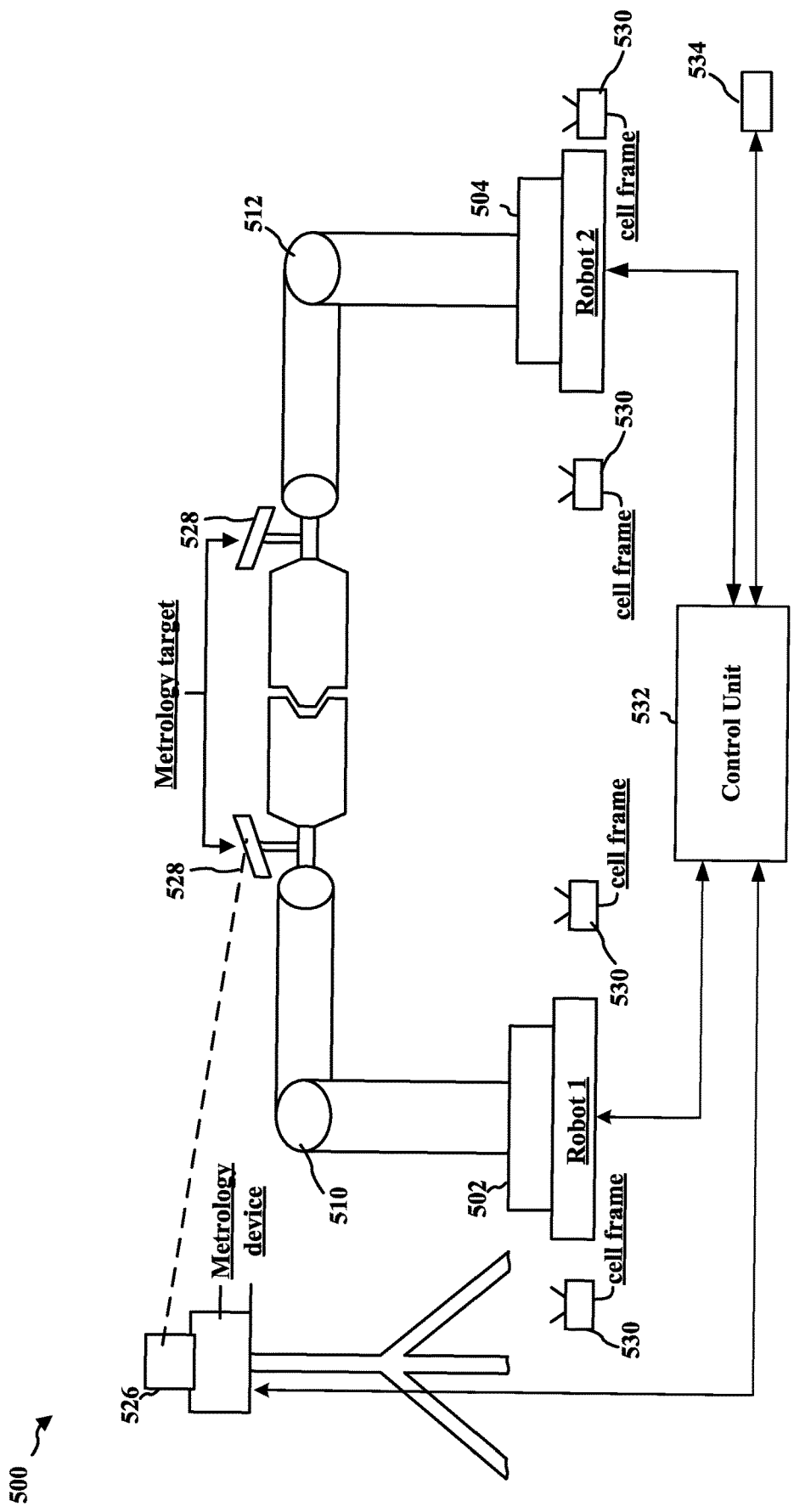
FIG. 5 is a diagram illustrating a perspective of a second assembly system including a plurality of robots acting as fixtures.

FIG. 5 is a diagram illustrating a perspective of a second assembly system 500 including a plurality of robots 502, 504 acting as fixtures. The second assembly system 500 is generally similar to the assembly system 400 but includes further details of using measurements to guide the robot. Metrology guidance may be used to guide the robots 502, 504 as assembly fixtures. The second assembly system 500 includes a metrology device 526, metrology targets 528, and cell frames 530. The cell frames may define the work area and provide a frame of reference within the work area.

A metrology's system accuracy may be applied to a critical motion path segment of multiple robots. In an aspect, the fixtureless assembly process may include a cell reference frame that may be created using computer-aided design (CAD). The cell reference frame may be matched to a physical robot cell.

The metrology device may be a metrology unit such as a laser, greyscale camera, or another device capable of taking measurements based on metrology targets. The metrology targets 528 may be mounted on robot flange and offset to the robot TCP.

Nominal target frames may be stored in the robot program, PLC, metrology software, or another database. Nominal frames may be dynamic and driven by scan results and/or probe results, as discussed with respect to FIG. 6 below. Each robot control unit 532 may be digitally connected to the metrology unit and metrology software.

In an aspect, the metrology process, in the context of assembling a node-based structure, may include a first robot sending a signal to a metrology unit to aim/focus on a critical location. The metrology unit may aim or focus on a location including a target and lock onto the target. For example, the metrology unit may use a small diameter scan and lock.

The metrology unit measures robot TCP location or another critical feature offset from a target. An aspect may compare a measured location value to a dynamic nominal location value. For example, a system may compare where a robot thinks a node is located to where the node is actually located. A system may then compute a transformation matrix to move from a current location to a goal location. The transformation matrix may be applied to a robot control unit/PLC 532, and the robot may move to a desired location. A confirmation measurement may be performed. Accuracy boundaries may be adjustable, such as gain or other values minimize cycle time. Additionally, a second robot may send a signal to the metrology unit to aim/focus on a location. The process may continue and be repeated.

In an aspect, the control unit 532 may cause a scanner 534 to scan a first subcomponent to determine a relative location of the first feature of the first subcomponent relative to the TCP. A robot 502, 504 may be configured to pick up the first subcomponent based on the scanning.

In an aspect, multiple metrology units and/or types of metrology units may be integrated to reduce cycle time. Measurements may also be taken in parallel with correction applied in parallel. Corrections may be applied only to the particular segments of the robot path. One metrology system may be used to apply a correction to n number of robots.

The control unit 532 illustrated in FIG. 5 may be a robotic assembly control unit 532. The robotic assembly control unit 532 may include at least one processor and a memory coupled to the at least one processor. The memory may include instructions configuring the control unit 532 to receive a first target 528 location indicating where a first robot (e.g., robot 1) is to position a first feature of a first subcomponent. The first target 528 location proximal to a second target 528 location indicating where a second robot (e.g., robot 2) is to position a second feature of a second subcomponent such that the first subcomponent and the second subcomponent form a component when coupled together with the first feature of the first subcomponent in the first location and the second feature of the second subcomponent in the second location.

The control unit 532 may calculate a first calculated location of the first feature of the first subcomponent and measure a first measured location of the first feature of the first subcomponent. Additionally, the control unit 532 may determine a first transformation matrix between the first calculated location and the first measured location and reposition the first feature of the first subcomponent to the first target location using the first robot, the repositioning based on the first transformation matrix. In an aspect, repositioning of the first feature of the first subcomponent and/or repositioning the second feature of the second subcomponent may be further based on a relative comparison of the first calculated location and the second calculated location. Accordingly, the features on the subcomponent may be located relative to each other directly, rather than relative to another reference frame rather than an absolute reference to a cell frame.

Accordingly, the control unit 532 may be coupled to the metrology device 526 and the robots (e.g., robot 1 and robot 2). Accordingly, measuring a first measured location of a first feature of a first subcomponent and measuring a second measured location of a second feature of a second subcomponent may use the same metrology unit, e.g., the metrology device 526. Using information from the metrology device 526, the control unit 532 may calculate the first calculated location of the first feature of the first subcomponent and measure the first measured location of the first feature of the first subcomponent. The control unit 532 may then determine a first transformation matrix. The transformation matrix may be applied to adjust the position of a component held by the robot arm 510, 512. The measurements and calculations may be completed iteratively until the component or node is positioned as accurately as needed for the task. For example, two nodes may be located accurately enough to for a fixture to connect the two nodes.

The control unit 532 is illustrated in FIG. 5 as an individual unit coupled to the robots (robot 1 and robot 2) and the metrology device 526. In other aspects, the control unit 532 may be made up of multiple sub-control units. These multiple sub-control units may be distributed among different devices. For example, the control unit 532 may be distributed between some combination of a separate unit, within one or more robots, and/or within one or more metrology devices 526. For example, processing functionality may be located in the metrology device 526, the first robot (robot 1), the second robot (robot 2), and an external control unit, e.g., coupled to the metrology device 526, the first robot (robot 1), the second robot (robot 2).

Figure 6:
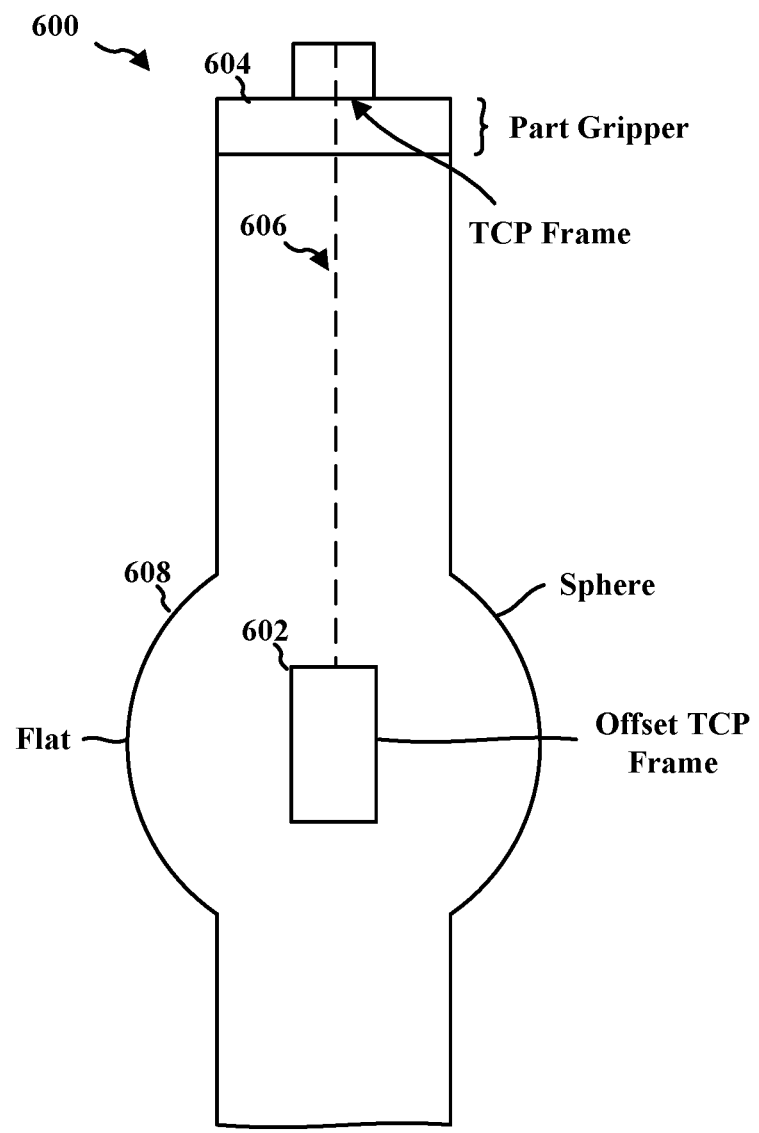
FIG. 6 is a diagram illustrating a fixture point printed directly on a part.

FIG. 6 is a diagram illustrating a fixture point 602 printed directly on a part 600. The part includes a part gripper portion 604. An end of a robot arm 510, 512 may grip the part at the part gripper portion 604. Accordingly, the part 600 may be positioned by the robotic arm 510, 512. Thus, the control unit 532 may determine target 528 locations using measurements from the metrology device 526. The control unit 532 may then control the robots (robot 1 and/or robot 2) to position components being held by the robot arms 510, 512.

The part 600 may be characterized, e.g., scanned, probed, or otherwise measured. As part of the characterization, features such as joints, bolt locations, or other features may be a fit to nominal data using a CAD model. For example, as part of the characterization, features such as joints, bolt locations, or other features may be a best fit to nominal data using a CAD model or other fit, e.g., any fit to determining an accurate characterization between two features. The characterization may measure the part relative to a TCP frame 606. A best fit may be calculated based on the geometries of the features relative to the TCP frame 606. Once the best fit of the features is performed, a fixture point 602 on the part may be calculated as a product of the calculated best fit. The fixture point 602 may allow the physical part to determine the fixture location that will lead to the most accurate assembly. The fixture point 602 may be printed directly into the product with the robot TCP acting as the fixture and a scanning fixture may be constructed with the robotic interface on it. Using the calculated best fit, adaptive fixture positions may be relocated in real time. The relocation of the fixture point may be driven by product geometry to maximize product accuracy and minimize overall assembly tolerance.

For example, the part 600 may include a sphere 608. The fixture point 602 may be at the center of the sphere 608. However, the sphere 608 may be imperfect. Accordingly, the part may be characterized to select a best location for the fixture point. The fixture point 602 may be an offset relative to the TCP frame.

The control unit 532 of FIG. 5 may cause a scanner 534 to scan a first subcomponent (e.g., part 600) to determine a relative location of the first feature (e.g., fixture point 602) of the first subcomponent (e.g., part 600) relative to the TCP. The robot 502, 504 may be configured to pick up the first subcomponent based on the scanning. For example, the robot 502, 504 may pick up the first subcomponent at or near the TCP based on the scanning. In an aspect, the robot 502, 504 may pick up the first subcomponent at or near the part gripper along the TCP based on the scanning. Accordingly, the system may be able to locate the first feature (e.g., fixture point 602) of the first subcomponent (e.g., part 600) relative to the TCP based on where the robot 502, 504 picking up the first subcomponent (e.g., part 600) based on the scanning.

Figure 7:
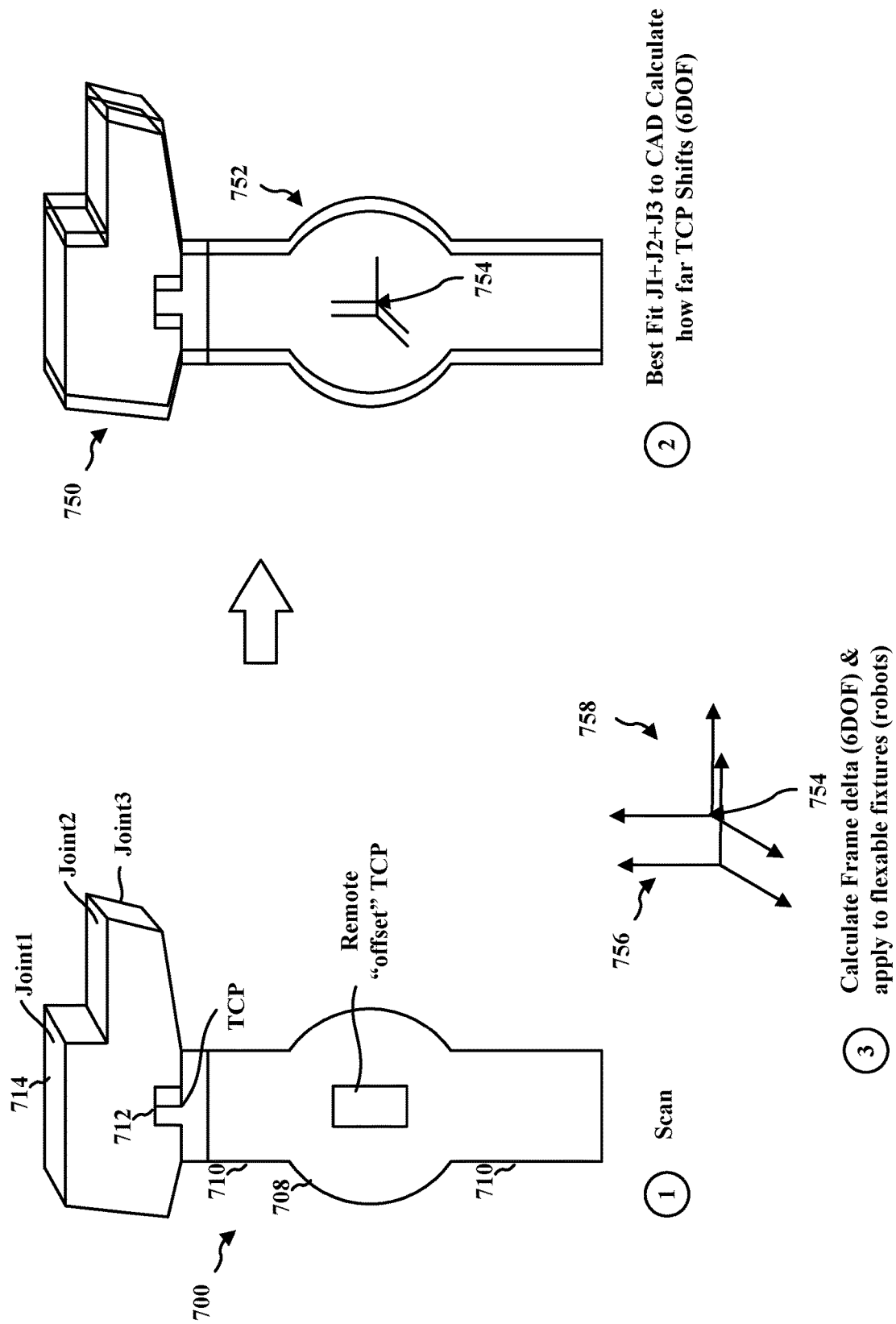
FIG. 7 is a diagram illustrating part scanning and fitting on a fixture.

FIG. 7 is a diagram illustrating part 700 scanning and fitting on a fixture. In the diagram illustrates scanning the part 700 (1), determining a fit for the part 700 (2), and calculating a delta from a frame for the part 700.

In an example, a fixture may have a feature which can easily be probed or scanned (1) to represent the robot TCP. For example, a sphere 708 with two flats 710 aligned so that its center is concentric with the center of the robot gripper/TCP 712. The CAD file of each part includes the fixture 714 attached to each part 700.

When determining the fit (2), the scan 750 may be of both the part 700 and the fixture 714. The scan 750 is then overlaid with the CAD design 752 so that the features may be fit. The features may carry varying significance in the best fitting calculation. With just the main features, the fit may be used to determine a new location of the TCP 754, e.g., at the center of the fixture sphere. The new location of the TCP 754 may be recorded as a calculated delta from a frame representing a CAD representation 756 of a part and a frame 758 based on an actual physical part with a newly located TCP 754. The new TCP location 754 may be communicated in real time via a digital signal to an assembly cell software. The new location of the TCP 754 becomes the goal frame 758 in reference to a cell working frame 756 for the metrology system to correct the robot TCP to 754. The goal frame 758 may be used in place of an ideal fixture location (TCP) from an idealized CAD design. The goal frame 758 may be based on product geometry and may be applied in real time to the assembly process of an actual physical part. For example, a best fit or other fit, e.g., a fit to determining an accurate characterization between two features.

Figure 8:
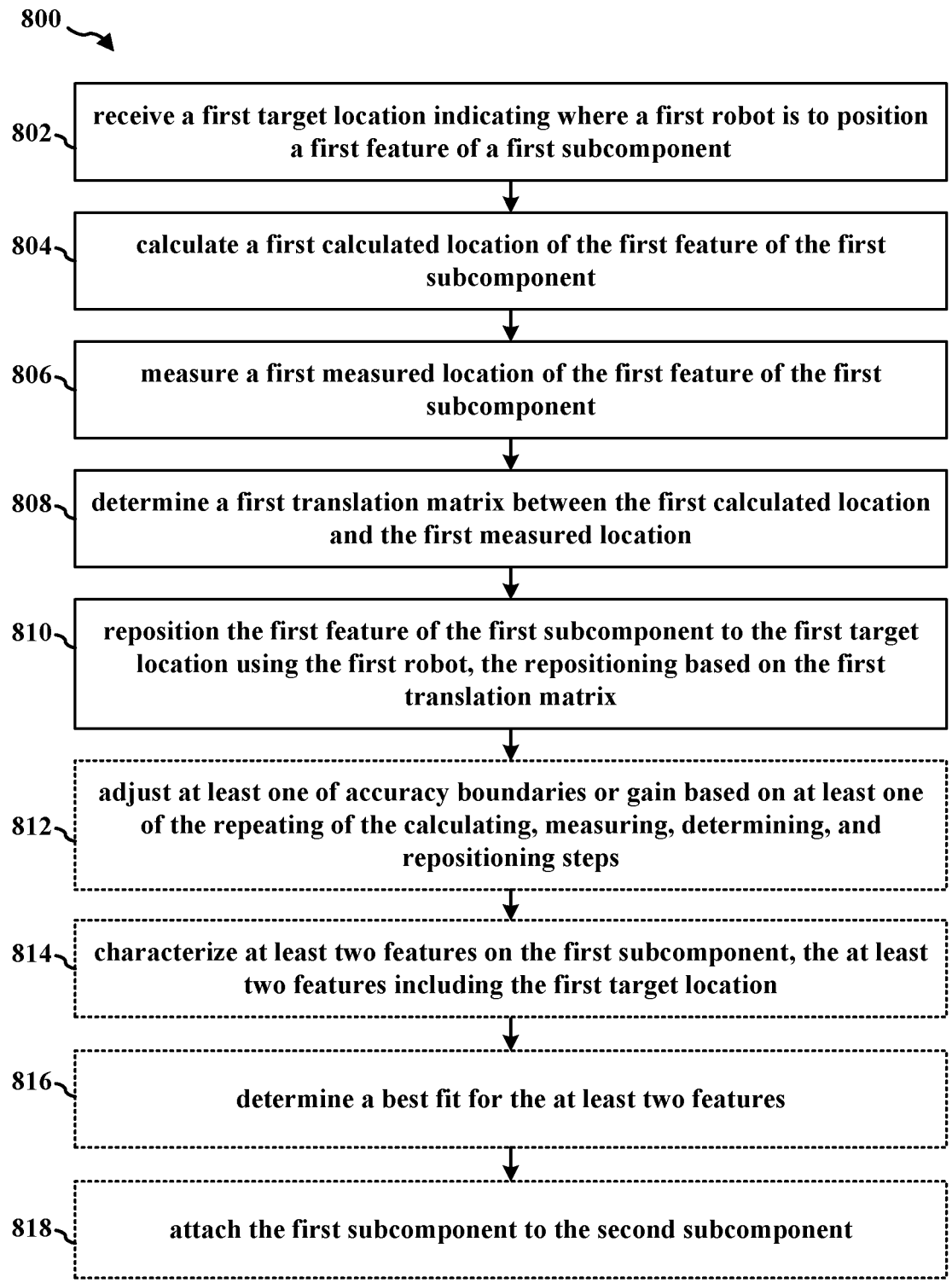
FIG. 8 is a conceptual flow diagram in accordance with the systems and methods described herein.

FIG. 8 is a conceptual flow diagram in accordance with the systems and methods described herein. At 802 a control unit 532 may receive a first target location indicating where a first robot is to position a first feature of a first subcomponent. The first target location may be proximal to a second target location indicating where a second robot is to position a second feature of a second subcomponent such that the first subcomponent and the second subcomponent form a component when coupled together with the first feature of the first subcomponent in the first location and the second feature of the second subcomponent in the second location. The first target location may be a tool center point (TCP) and/or an offset from a TCP.

Accordingly, the control unit 532 receive target 528 location information from the metrology device 526. The location information may indicate locations for nodes held by robot arms. For example, the location of the nodes may be known relative to the targets 528. In an aspect, at least one of the first subcomponent may be a complex structure. The complex structure may be an automobile chassis.

At 804, the control unit 532 may calculate a first calculated location of the first feature of the first subcomponent. The first calculated location may include a dynamic nominal location indicating a calculated location of a moving first feature at a specific time. The specific time may coincide with the measuring of the first location of the first feature.

For example, the control unit 532 may calculate a location using the location information received from the metrology device 526. Because the location of the nodes may be known relative to the targets 528, the control unit 532 may calculate a first calculated location of the first feature of the first subcomponent.

At 806, the control unit 532 may measure a first measured location of the first feature of the first subcomponent. Measuring a first measured location of the first feature of the first subcomponent may include scanning the shape of the part. Additionally, scanning the shape of the part may include scanning the part (e.g., a first subcomponent) to determine a relative location of a first feature of the part relative to the TCP of the part. The first robot may be configured to pick up the part based on the scanning. For example, the first robot may pick up a first subcomponent on a TCP. Accordingly, the first robot may position the first feature based on the first feature's relative position to the TCP.

The first robot may signal a control unit 532 causing the control unit 532 to measure the first measured location of the first feature of the first subcomponent. In an aspect, measuring the first measured location of the first feature of the first subcomponent and measuring the second measured location of the second feature of the second subcomponent use a same metrology unit.

At 808, the control unit 532 may determine a first transformation matrix between the first calculated location and the first measured location. Measuring a first measured location of the first feature of the first subcomponent comprises measuring a fixture point printed on the first subcomponent. For example, the control unit 532 may calculate frame deltas from an idealized frame based on a CAD design and a frame based on an actual physical device that may have differences from an idealized CAD design. (By idealized CAD design, the Applicant means the model design without inclusions of tolerances. The actual CAD design will generally include tolerances. A part that is made within tolerance may then be modeled as described herein using the frame delta. Parts not made within tolerances might be discarded.)

At 810, the control unit 532 may reposition the first feature of the first subcomponent to the first target location using the first robot, the repositioning based on the first transformation matrix. Repositioning the first feature of the first subcomponent to the first target location using the first robot based on the first transformation matrix comprises sending the first transformation matrix to a control unit 532 in the first robot. Repositioning the first feature of the first subcomponent may be further based on a relative comparison of the first calculated location and a second calculated location.

In an aspect, the control unit 532 may repeat the calculating 804, measuring 806, determining 808, and repositioning 810 steps. In another aspect, the control unit 532 may repeat one or more of 802, 804, 806, 808, and 810. In an aspect, the repeating of one or more of 802, 804, 806, 808, and 810 may be relative to a second target. For example, the control unit 532 may receive a second target location indicating where the second robot is to position the second feature of the second subcomponent. The control unit 532 may calculate a second calculated location of the second feature of the second subcomponent. The control unit 532 may also measure a second measured location of the second feature of the second subcomponent. Additionally, the control unit 532 may determine a second transformation matrix between the second calculated location and the second measured location. The control unit 532 may also reposition the second feature of the second subcomponent to the second target location using the second robot. The repositioning may be based on the second transformation matrix.

At 812, the control unit 532 may adjust at least one of accuracy boundaries or gain based on at least one of the repeating of the calculating, measuring, determining, and repositioning steps.

At 814, the control unit 532 may characterize at least two features on the first subcomponent, the at least two features including the first target location.

At 816, the control unit 532 may determine a fit, such as a best fit, for the at least two features. Repositioning the first feature of the first subcomponent to the first target location may use the first robot. The repositioning may be based on the first transformation matrix and may be further based on the best fit.

At 818, the control unit 532 may attach the first subcomponent to the second subcomponent. Attaching the first subcomponent to the second subcomponent may include attaching the first subcomponent to the second subcomponent using an ultra-violet (UV) adhesive.

The present disclosure is provided to enable any person skilled in the art to practice the various aspects described herein. Various modifications to these exemplary embodiments presented throughout the present disclosure will be readily apparent to those skilled in the art, and the concepts disclosed herein may be applied to other techniques for printing nodes and interconnects. Thus, the claims are not intended to be limited to the exemplary embodiments presented throughout the disclosure but are to be accorded the full scope consistent with the language claims. All structural and functional equivalents to the elements of the exemplary embodiments described throughout the present disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A method of robotic assembly, comprising:
   measuring a first feature of a first subcomponent;
   fitting the first feature to a corresponding feature of a computer-aided design (CAD) model of the first subcomponent;
   determining a fixture location of the first subcomponent based on the fitting;
   receiving a first target location indicating where a first robot is to position the fixture location of the first subcomponent, the first target location proximal to a second target location indicating where a second robot is to position a second feature of a second subcomponent such that the first subcomponent and the second subcomponent form a component when coupled together with the fixture location of the first subcomponent in the first target location and the second feature of the second subcomponent in the second target location;
   calculating a first calculated location of the fixture location;
   measuring a first measured location of the fixture location;
   determining a first transformation matrix between the first calculated location and the first measured location; and
   repositioning the fixture location to the first target location using the first robot, the repositioning based on the first transformation matrix.

2. The method of claim 1, further comprising:
   receiving a second target location indicating where the second robot is to position the second feature of the second subcomponent;
   calculating a second calculated location of the second feature of the second subcomponent;
   measuring a second measured location of the second feature of the second subcomponent;
   determining a second transformation matrix between the second calculated location and the second measured location; and
   repositioning the second feature of the second subcomponent to the second target location using the second robot, the repositioning based on the second transformation matrix.

3. The method of claim 2, wherein measuring the first measured location of the fixture location of the first subcomponent and measuring the second measured location of the second feature of the second subcomponent use a same metrology unit.

4. The method of claim 2, wherein at least repositioning the fixture location of the first subcomponent or repositioning the second feature of the second subcomponent is further based on a relative comparison of the first calculated location and the second calculated location.

5. The method of claim 1, wherein at least the first subcomponent or the second subcomponent comprise a plurality of components.

6. The method of claim 5, wherein the plurality of components comprises a chassis for a transport structure.

7. The method of claim 1, wherein the first target location comprises a tool center point (TCP).

8. The method of claim 1, wherein the first target location comprises a location offset from a tool center point (TCP).

9. The method of claim 8, wherein the measuring of the first feature including scanning the first subcomponent to determine a relative location of the fixture location of the first subcomponent relative to the TCP, the first robot configured to pick up the first subcomponent based on the scanning.

10. The method of claim 1, wherein the first calculated location comprises a dynamic nominal location indicating a calculated location of a moving fixture location at a specific time, the specific time coinciding with the measuring of a first location of the fixture location.

11. The method of claim 1, further comprising repeating the calculating, the measuring, the determining, and the repositioning.

12. The method of claim 1, further comprising adjusting at least accuracy boundaries or gain based on repeating of at least the calculating, the measuring, the determining, or the repositioning.

13. The method of claim 1, wherein measuring the first measured location of the fixture location of the first subcomponent comprises measuring by a processor.

14. The method of claim 1, wherein repositioning the fixture location of the first subcomponent to the first target location using the first robot based on the first transformation matrix comprises sending the first transformation matrix to a control unit in the first robot.

15. The method of claim 1, further comprising:
   measuring at least two locations on the first subcomponent, the at least two locations including the first target location,
   wherein the fitting including determining a fit for the at least two locations, and
   wherein repositioning the fixture location of the first subcomponent to the first target location using the first robot, the repositioning based on the first transformation matrix is further based on the fit for the at least two locations.

16. The method of claim 1, wherein measuring the first measured location of the fixture location of the first subcomponent comprises scanning a shape of a part.

17. The method of claim 1, wherein measuring the first measured location of the fixture location of the first subcomponent comprises measuring a fixture point on the first subcomponent.

18. The method of claim 1, further comprising attaching the first subcomponent to the second subcomponent.

19. The method of claim 18, wherein attaching the first subcomponent to the second subcomponent includes attaching the first subcomponent to the second subcomponent using a ultra-violet (UV) adhesive.

20. The method of claim 1, wherein the first feature includes the fixture location.

21. The method of claim 1, wherein the first feature includes a geometry of the first subcomponent.

22. The method of claim 21, wherein the geometry includes at least a surface of the first subcomponent.

23. The method of claim 1, wherein the first feature includes a joint.

24. The method of claim 1, wherein the fitting of the first feature including performing a best fit to data.

25. The method of claim 24, wherein the performing of the best fit including performing a calculation based on a first geometry of the first feature relative to a tool center point (TCP) frame.

26. The method of claim 25, wherein the first feature including a second feature, and
wherein the performing of the calculation is based on a second geometry of the second feature relative to the TCP frame.

27. The method of claim 1, wherein the determining of the fixture location including performing a calculation of an offset relative to a tool center point (TCP) frame.

28. The method of claim 27, wherein the performing of the calculation is based on a best fit calculation.

29. The method of claim 27, wherein the TCP frame is defined on the first subcomponent.

30. A system for robotic assembly, comprising:
a first subcomponent comprising a first feature;
a first robot;
a second robot; and
a control unit coupled to the first robot and the second robot, wherein the control unit includes a processor configured to:
measure the first feature,
fit the first feature to a corresponding feature of a computer-aided design (CAD) model of the first subcomponent,
determine a fixture location of the first subcomponent based on the fit of the first feature to the corresponding feature,
receive a first target location indicating where the first robot is to position the fixture location of the first subcomponent, the first target location proximal to a second target location indicating where the second robot is to position a second feature of a second subcomponent such that the first subcomponent and the second subcomponent form a component when coupled together with the fixture location of the first subcomponent in the first target location and the second feature of the second subcomponent in the second target location,
calculate a first calculated location of the fixture location,
measure a first measured location of the fixture location,
determine a first transformation matrix between the first calculated location and the first measured location, and
reposition the fixture location to the first target location using the first robot, the repositioning based on the first transformation matrix.

31. The system of claim 30, wherein the control unit further receives a second target location indicating where the second robot is to position the second feature of the second subcomponent; calculates a second calculated location of the second feature of the second subcomponent; measures a second measured location of the second feature of the second subcomponent; determines a second transformation matrix between the second calculated location and the second measured location; and repositions the second feature of the second subcomponent to the second target location using the second robot, the repositioning based on the second transformation matrix.

32. The system of claim 31, wherein measuring the first measured location of the fixture location of the first subcomponent and measuring the second measured location of the second feature of the second subcomponent use a same metrology unit.

33. The system of claim 31, wherein at least repositioning the fixture location of the first subcomponent or repositioning the second feature of the second subcomponent is further based on a relative comparison of the first calculated location and the second calculated location.

34. The system of claim 30, wherein at least the first subcomponent or the second subcomponent comprise a plurality of components.

35. The system of claim 34, wherein the plurality of components comprises a chassis for a transport structure.

36. The system of claim 30, wherein the first target location comprises a tool center point (TCP).

37. The system of claim 30, wherein the first target location comprises a location offset from a tool center point (TCP).

38. The system of claim 37, wherein measuring the first feature including scanning the first subcomponent to determine a relative location of the fixture location of the first subcomponent relative to the TCP, the first robot configured to pick up the first subcomponent based on the scanning.

39. The system of claim 30, wherein the first calculated location comprises a dynamic nominal location indicating a calculated location of a moving fixture location at a specific time, the specific time coinciding with the measuring of a first location of the fixture location.

40. The system of claim 30, the control unit further configured to repeat the calculating, the measuring, the determining, and the repositioning.

41. The system of claim 20, the control unit further configured to adjust at least accuracy boundaries or gain based on repeating of at least the calculating, the measuring, the determining, or the repositioning.

42. The system of claim 30, wherein the first robot signals the control unit causing the control unit to measure the first measured location of the fixture location of the first subcomponent.

43. The system of claim 30, wherein repositioning the fixture location of the first subcomponent to the first target location using the first robot based on the first transformation matrix comprises sending the first transformation matrix to the control unit.

44. The system of claim 30, the control unit further configured to:
characterize at least two features on the first subcomponent, the at least two features including the first target location,
wherein the fitting including determine a fit for the at least two features, and
wherein repositioning the fixture location of the first subcomponent to the first target location using the first robot, the repositioning based on the first transformation matrix is further based on the fit for the at least two features.

45. The system of claim 30, wherein measuring the first measured location of the fixture location of the first subcomponent comprises scanning a shape of a part.

46. The system of claim 30, wherein measuring the first measured location of the fixture location of the first subcomponent comprises measuring a fixture point on the first subcomponent.

47. The system of claim 30, the control unit further configured to attach the first subcomponent to the second subcomponent.

48. The system of claim 37, wherein attaching the first subcomponent to the second subcomponent includes attaching the first subcomponent to the second subcomponent using a ultra-violet (UV) adhesive.

49. The system of claim 30, wherein the control unit comprises a distributed control unit located in at least the first robot or the second robot.

50. The system of claim 30, wherein the first feature includes the fixture location.

51. The system of claim 30, wherein the first feature includes a geometry of the first subcomponent.

52. The system of claim 51, wherein the geometry includes at least a surface of the first subcomponent.

53. The system of claim 30, wherein the first feature includes a joint.

54. The system of claim 30, wherein the fit of the first feature includes a best fit to data.

55. The system of claim 54, wherein the best fit includes a calculation based on a first geometry of the first feature relative to a tool center point (TCP) frame.

56. The system of claim 55, wherein the first feature includes a second feature, and
wherein the calculation of the best fit is based on a second geometry of the second feature relative to the TCP frame.

57. The system of claim 30, wherein determining of the fixture location includes a calculation of an offset relative to a tool center point (TCP) frame.

58. The method of claim 57, wherein the calculation of the determining of the fixture is based on a best fit calculation.

59. The system of claim 57, wherein the TCP frame is defined on the first subcomponent.

60. A robotic assembly control unit, comprising:
at least one processor; and
a memory coupled to the at least one processor, the memory including instructions configuring the control unit to:
measure a first feature of a first subcomponent,
fit the first feature to a corresponding feature of a computer-aided design (CAD) model of the first subcomponent,
determine a fixture location of the first subcomponent based on the fit of the first feature to the corresponding feature,
receive a first target location indicating where a first robot is to position the fixture location of a first subcomponent, the first target location proximal to a second target location indicating where a second robot is to position a second feature of a second subcomponent such that the first subcomponent and the second subcomponent form a component when coupled together with the fixture location of the first subcomponent in the first target location and the second feature of the second subcomponent in the second target location,
calculate a first calculated location of the fixture location,
measure a first measured location of the fixture location,
determine a first transformation matrix between the first calculated location and the first measured location, and
reposition the fixture location to the first target location using the first robot, the repositioning based on the first transformation matrix.

61. A non-transitory computer-readable medium storing computer executable code for robotic assembly, the code, when executed by a processor, causing the processor to:
measure a first feature of a first subcomponent,
fit the first feature to a corresponding feature of a computer-aided design (CAD) model of the first subcomponent,
determine a fixture location of the first subcomponent based on the fit of the first feature to the corresponding feature,
receive a first target location indicating where a first robot is to position the fixture location of the first subcomponent, the first target location proximal to a second target location indicating where a second robot is to position a second feature of a second subcomponent such that the first subcomponent and the second subcomponent form a component when coupled together with the fixture location of the first subcomponent in the first target location and the second feature of the second subcomponent in the second target location,
calculate a first calculated location of the fixture location,
measure a first measured location of the fixture location,
determine a first transformation matrix between the first calculated location and the first measured location, and
reposition the fixture location to the first target location using the first robot, the repositioning based on the first transformation matrix.

* * * * *